Patented Dec. 15, 1931

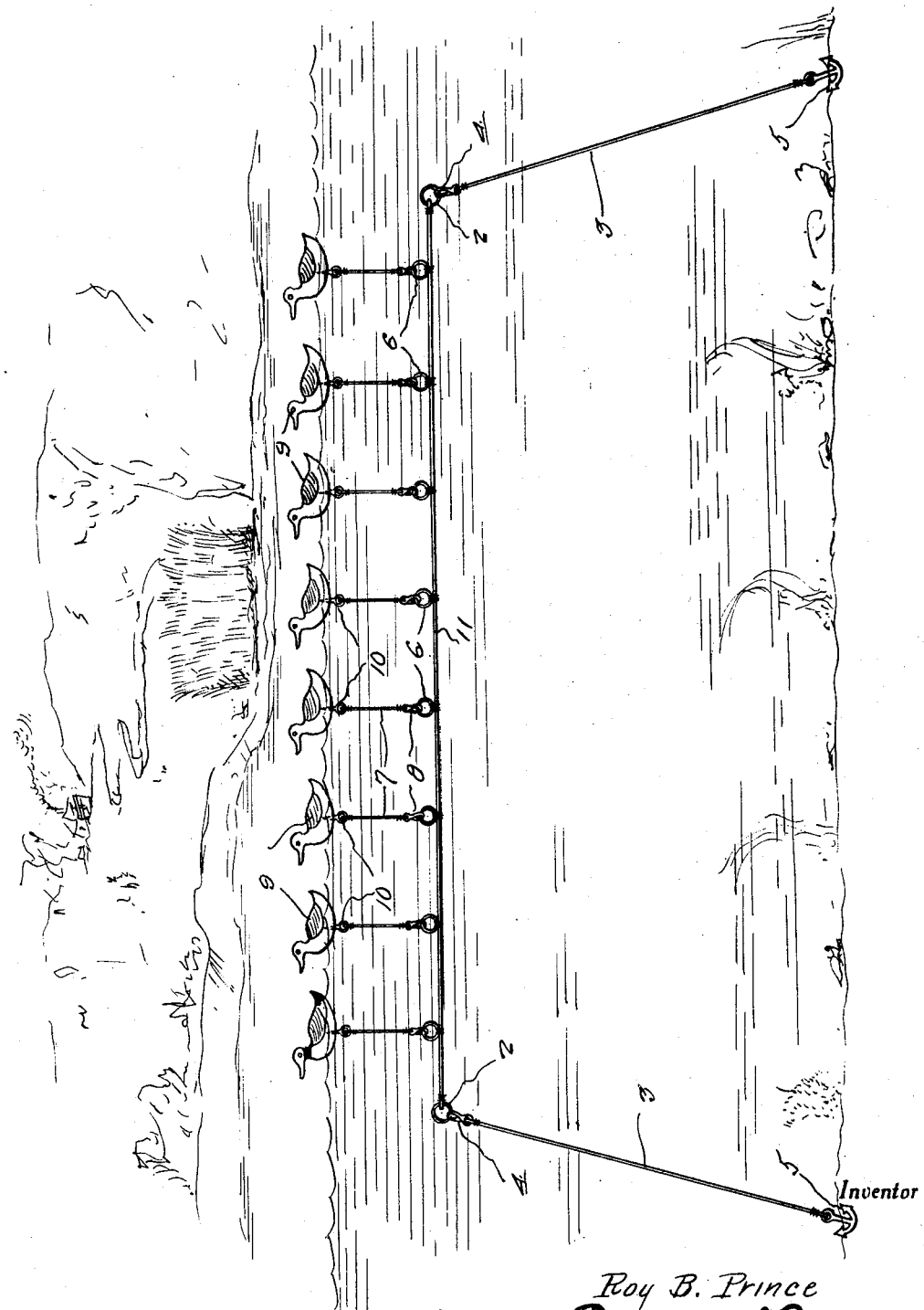

1,836,504

UNITED STATES PATENT OFFICE

ROY B. PRINCE, OF ASHLAND, WISCONSIN

DECOY DUCK SETTER

Application filed November 25, 1930. Serial No. 498,164.

This invention relates to a decoy duck setter and has for its primary object to provide, in a manner as hereinafter set forth, a device of this character embodying a novel construction, and arrangement of parts whereby a plurality of decoys may be arranged in various formations, which formations will be maintained regardless of wind, or current.

Another important object of the invention is to provide a decoy duck setter of the character described embodying means whereby a plurality of decoys may be placed in the water simultaneously or removed therefrom.

Other objects of the invention are to provide a decoy duck setter which will be simple in construction, strong, durable, efficient and reliable in use and which may be manufactured at low cost.

All of the foregoing and still further objects and advantages of the invention may become apparent from a study of the following specification, taken in connection with the accompanying drawing wherein the single figure is a view in side elevation of a device in accordance with the present invention.

Referring to the drawing in detail, it will be seen that the reference numeral 1 designates a set line formed of suitable flexible material and having secured to its ends the rings 2 anchoring the lines 3 also of suitable flexible material have one end secured to the rings 2 through the medium of snap hooks 4 whereby the anchoring lines may be detached when it is so desired. Anchors 5 are secured to the other ends of the anchoring lines 3 for securing the device in position, as will be obvious. The anchoring lines 3 are of a length to submerge the set line 1.

Secured at longitudinally spaced points on the set line 1 by any suitable means is a series of comparatively small rings 6. Decoy retaining lines 7 of flexible material have one end detachably secured to the rings 6 by snap hooks 8 and their other ends secured to the decoys 9 by the eye screws 10 which are threaded into the bottoms of the decoys 9 and to which the retaining lines 7 are secured. The retaining lines 7 are, of course, of a length sufficient to permit the decoys 9 to float on the surface of the water. All of the flexible lines are preferably treated with a suitable water resisting composition to prolong the usefulness of said lines.

It is believed that the many advantages of a device in accordance with this invention will be readily understood, and although the preferred embodiment of the invention is as illustrated and described, it is to be understood that changes in the details of construction may be had which will fall within the scope of this invention as claimed.

What is claimed as new is:

A device of the character described comprising a strand of flexible material for submergence in a body of water, rings on the ends of the strand, a pair of anchoring lines, snap hooks on one end of the anchoring lines for detachable engagement with the rings for securing the anchoring lines thereto, anchors on the other ends of the anchoring lines, a plurality of rings secured at longitudinally spaced points to intermediate portions of the flexible strand, a plurality of decoys, eye screws threaded into the bottoms of the decoys, retaining lines of flexible material having one end secured to the eye screws and snap hooks on the other ends of the retaining lines for detachable engagement with the last named rings for securing the decoys to the flexible material.

In testimony whereof I affix my signature.

ROY B. PRINCE.